(No Model.)

E. G. DORCHESTER.
CULTIVATOR SHANK AND TOOTH ATTACHMENT.

No. 430,841. Patented June 24, 1890.

WITNESSES:
C. L. Bendixon
Mark W. Dewey

INVENTOR:
Edward G. Dorchester
BY
Duell, Laass & Duell
his ATTORNEYS

UNITED STATES PATENT OFFICE.

EDWARD G. DORCHESTER, OF GENEVA, NEW YORK.

CULTIVATOR SHANK AND TOOTH ATTACHMENT.

SPECIFICATION forming part of Letters Patent No. 430,841, dated June 24, 1890.

Application filed March 8, 1890. Serial No. 343,109. (No model.)

*To all whom it may concern:*

Be it known that I, EDWARD G. DORCHESTER, of Geneva, in the county of Ontario, in the State of New York, have invented new and useful Improvements in Cultivator Shank and Tooth Attachments, of which the following, taken in connection with the accompanying drawings, is a full, clear, and exact description.

The object of this invention is to adapt the cultivator-shank to interchangeably connect directly thereto either a straight tooth or teeth of different degrees of curvature, and to effect the attachment of the tooth by simple, inexpensive, and secure means; and to that end the invention consists, essentially, in the combination of a cultivator-shank formed with a recess in its front, the tooth resting on the shank at the ends of the recess and free from the shank over the recess, and a suitable tie connected to the recessed portion of the shank and securing the tooth in its position, all as hereinafter more fully described, and set forth in the claim.

Figure 1:
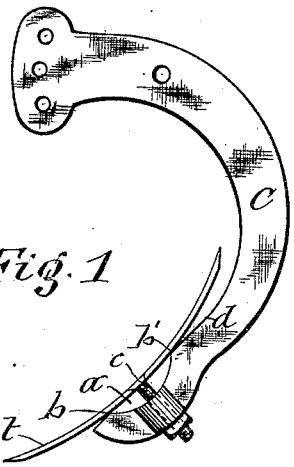
Figure 3:
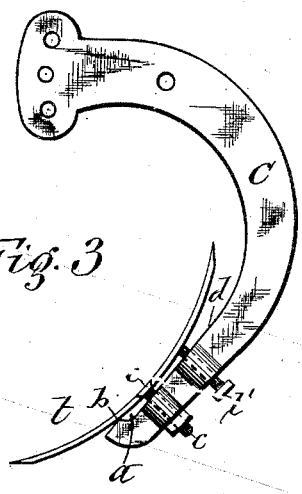
Figure 4:
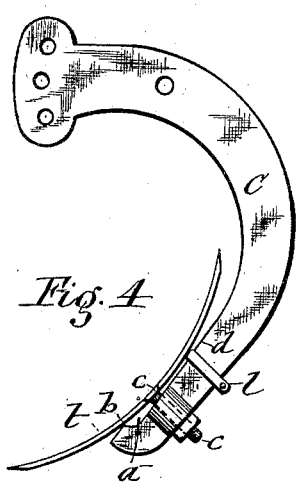
Figure 5:
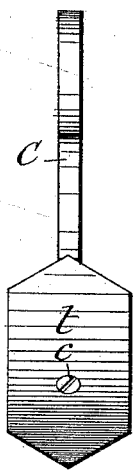

In the annexed drawings, Figures 1, 2, 3, and 4 are side views of cultivator-shanks with teeth attached thereto embodying my invention, and Fig. 5 is a front view of the cultivator shank and tooth represented in Fig. 1.

Similar letters of reference indicate corresponding parts.

C denotes the cultivator-tooth-supporting shank, the upper end portion of which may be of any suitable form and secured to the cultivator-frame in any suitable or well-known manner. The lower end portion is inclined forward, and I form the same with a curved recess $a$ in its front, leaving bearings $b\ b'$ at the ends of the recess.

Figure 2:
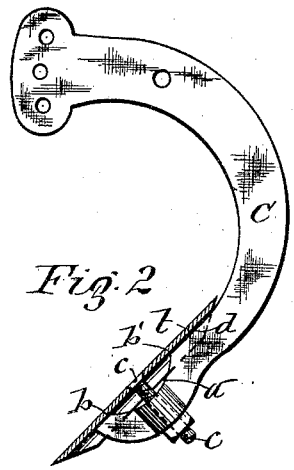

$t$ represents the cultivator-tooth, which is either curved longitudinally, as shown in Figs. 1, 3, and 4 of the drawings, or made straight, as represented in Fig. 2 of the drawings, the different-shaped teeth being desired for different kinds of soils and for different methods of cultivating the same; hence it is also desirable to have the cultivator-shanks adapted to interchangeably attach thereto different-shaped teeth, and this advantage I obtain by the bearings $b\ b'$ and intervening recess $a$, which allow a tooth of any ordinary degree of curvature to rest on the two bearings $b\ b'$ and stand free from the shank in front of the recess $a$, the tooth being secured to the shank C by a suitable tie, preferably a tie-bolt $c$, passing through the portion of the tooth over the recess $a$, and through the recessed portion of the shank, the head of the bolt being countersunk in the face of the tooth, and the nut being applied to the bolt back of the shank. By tightening said nut the tooth $t$ is firmly gripped between the head of the bolt and the two bearings $b\ b'$, and thus the tooth is attached directly to the shank by means of a single tie-bolt.

To adapt the shank C for the attachment of a straight tooth as well as a curved tooth, I form the shank with a straight front face $d$, extending from the upper end of the recess upward and in line with the lower bearing $b$, as shown in Figs. 1 and 2 of the drawings. If desired, however, the straight face $d$ may be extended from the bottom or deepest portion of the recess $a$ upward, as shown in Figs. 3 and 4 of the drawings, and in that case I prefer to employ a bearing $e$, adjustably connected to the shank above the recess $a$. Said adjustable bearing may be of the form of a link $l$, embracing the shank C, and adapted to be slipped under the tooth, as shown in Fig. 4 of the drawings; but I prefer to employ for said adjustable bearing a set-screw $l'$, passing through the shank from the rear thereof and bearing on the back of the upper end portion of the tooth, as shown in Fig. 3 of the drawings.

Having described my invention, what I claim as new, and desire to secure by Letters Patent, is—

A cultivator-tooth-supporting shank formed with the curved recess $a$ in its front, the straight face $d$, extending upward from said recess, and the bearing $b$ on the lower end of the recess and in line with the aforesaid straight face, substantially as described and shown, for the purpose set forth.

In testimony whereof I have hereunto signed my name this 5th day of March, 1890.

EDWARD G. DORCHESTER. [L. S.]

Witnesses:
S. SOUTHWORTH,
JNO. W. MELLEN.